UNITED STATES PATENT OFFICE.

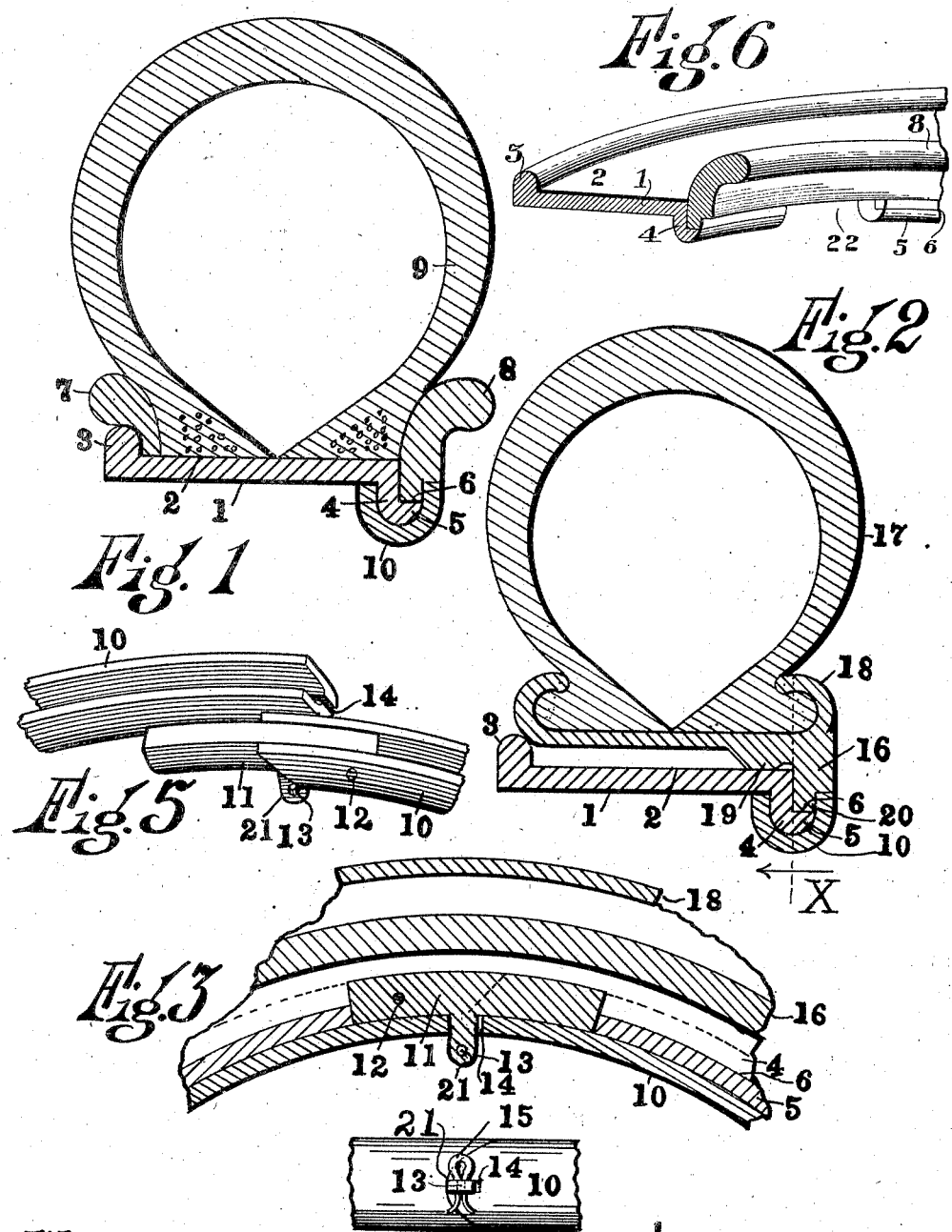

JOHN M. ALDERFER, OF SHARON CENTER, OHIO.

VEHICLE-WHEEL RIM.

965,847.  Specification of Letters Patent.  Patented Aug. 2, 1910.

Application filed December 3, 1909. Serial No. 531,263.

*To all whom it may concern:*

Be it known that I, JOHN M. ALDERFER, a citizen of the United States, residing at Sharon Center, in the county of Medina and State of Ohio, have invented new and useful Improvements in Vehicle-Wheel Rims, of which the following is a specification.

This invention relates to vehicle wheel rims for holding elastic tires, more especially the outer shoes of double-tube pneumatic tires, and the object is primarily to provide a wheel rim having detachable tire-retaining means for holding the outer shoe of an inextensible selvage edge type of tire provided with detachable locking means for securely holding one of the tire-retaining means, said rim after the removal of the tire-retaining means for the inextensible selvage edge tire constituting a supporting medium for an auxiliary rim carrying a previously-inflated tire, preferably of the clencher type and held in position by the same means previously utilized for sustaining the tire-retaining means for the inextensible selvage edge type of tire; that is to say, either type of tire may be alternately mounted upon said rim and held in position by a locking device common to both.

A further object of this invention is to provide a locking device for holding the tire-retaining means for either type of tire alternately in position against circumferential movement or creeping, said locking device provided with means for preventing its unintentional displacement or removal from its locking position while holding the detachable portion of the rim in coöperating relation with the fixed portion.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings, in which similar reference numerals indicate like parts in the different figures: Figure 1 is a view in transverse section of the rim-portion of a vehicle wheel with a tire of the inextensible selvage edge type mounted thereon and with the locking means for the tire-retaining means in coöperating relation therewith. Fig. 2 is a view similar to the rim shown in Fig. 1 with an auxiliary rim mounted thereon, said tire-holding rim held in position by the locking means shown in Fig. 1. Fig. 3 is a longitudinal, sectional view of Fig. 2 on line X thereof. Fig. 4 is an inverted plan showing the under face of the locking ring. Fig. 5 is a perspective view of the ends of the split locking ring separated from each other to better illustrate the construction thereof, and, Fig. 6 is a perspective view of the type of rim and tire-retaining means shown in Fig. 1 illustrating the registering notches therein.

Referring to the drawings in detail, the reference numeral 1 denotes a continuous annular rim provided with a seat 2 for a tire and provided along one side edge with an outwardly-extending flange 3 constituting an abutment and on the other side with an inwardly-extending flange 4 having a laterally-extending annularly-formed face 5, the outer portion 6 of which constitutes a seat for a purpose to be hereinafter described.

Mounted on the seat 2 of the rim 1 is a tire-retaining ring 7 the lateral faces of which are formed upon curvilinear lines, one of which is adapted to abut against and engage the flange 3 of the rim. Mounted on the seat 6 of the ridge 5 is a second ring 8 with the inner lateral face formed to correspond with the inner lateral face of the ring 7, and both of which are arranged to constitute supporting means for the sides of a tire 9 of the inextensible selvage edge type, as shown in the drawings. The inner portion of the ring 8 extends inwardly, and as before stated, seats on the seat 6 of the face 5 and with its inner lateral face bearing against the face of the depending flange 4. The ring 8 is held in position through the medium of a split expansible U-shaped locking ring 10 provided with a groove or channel adapted to inclose the flange 4; face 5 and inwardly-extending portion of the ring 8 for locking it securely in position. The split locking ring 10 is adapted to be sprung over the described portions of the rim and tire-retaining element by being first contracted, and is held in place when seated by its inherent resiliency in endeavoring to return to normal shape, during which operation it incloses the parts of the rim hereinbefore mentioned.

In order to prevent the tire-retaining ring 8 from circumferential movement on its seat 6 on the face 5, registering notches 22 are formed in both the inwardly-extending portion of the ring 8 and the inwardly-extending flange 4 of the rim. The locking means for preventing circumferential movement of the ring 8 consists of a member 11 suitably-shaped and mounted in the groove in the ring 10 and preferably held in position through the medium of pin 12. This member 11 is preferably disposed in the groove adjacent to the severed ends of the ring 10 so as to overlap and project into the opposing end thereof and is also of such a size and length that when the split ring 10 is sprung over the inwardly-extending flange 4 and face 5, the member 11 will engage in the registering notches 22 and constitute a lock for preventing longitudinal movement of the ring 8 with respect to the rim. The inner face of the member 11 is provided with an inwardly-extending lug 21 arranged to extend beyond the inner surface of the ring 10 adjacent to one of the severed ends thereof. The ring 10 is preferably severed on a line oblique to the axis of the wheel and the severed end opposing the end which carries the member 11 is provided with a longitudinal slot 14 to receive the lug 21 when the ring is in operative position. The lug 21 is provided with a transverse aperture 13 to receive some device such as a cotter-pin 15 for locking the slotted end of the ring against unintentional displacement.

In Fig. 2 is shown a supplemental tire rim 16, preferably previously supplied with an inflated clencher tire 17. This clencher tire 17 is provided with the usual inturned clencher flanges 18 for holding the base portion of the shoe of the tire, and is of such a diameter that when passed laterally onto the rim 1 it will be supported on one side by the outwardly-extending flange or abutment 3, and on the other side by an inwardly-extending circumferential face 19 which bears or rests upon the outer face of the seat 2 of the rim 1. The clencher rim 16 is provided with an inwardly-extending flange 20 adapted to seat on the face 5 and be held in position by the locking ring 10 in the same manner as has been described with reference to the tire-holding ring 8 heretofore mentioned. The inwardly-extending flange 20 of the supplemental rim 16 is also similarly provided with a notch arranged to register with the notch in the inwardly-extending flange 4 to receive the member 11 for locking the auxiliary rim 16 against circumferential movement.

From the foregoing it will be seen that in using this device the operator of the vehicle may carry an extra tire rim supplied with an inflated clencher tire, and when for any reason the inextensible selvage edge tire originally placed on the rim 1 has been punctured or so badly damaged as to be unserviceable, the selvage edge type of tire may be removed, together with its tire-retaining rings 7 and 8, after which the clencher rim with its previously-inflated tire may be passed laterally onto and seat upon the rim 1 and be locked in position through the medium of the self-expansible grooved ring 10, and at the same time the member 11 carried by the ring will effectually lock the clencher tire rim against circumferential movement with respect to the wheel rim, and as the clencher tire is securely held by the clencher rim the danger of the tire creeping in its channel is eliminated.

I claim:

1. A vehicle wheel comprising an annular body portion the outer face of which constitutes a seat for a tire and having along one edge thereof an outwardly-extending flange constituting an abutment and along the opposite edge an inwardly-extending flange provided with a laterally-extending annularly-fashioned face constituting a seat, said latter flange provided with a transversely-extending notch, an annular tire-holding means mounted on said rim seat and abutting against said outwardly-extending flange having the inner lateral face thereof formed to engage a tire, a second tire-retaining means having the inner lateral face thereof conforming to the first-mentioned tire-retaining means and adapted to be mounted on said laterally-extending seat, said last-mentioned tire-retaining means provided with a notch registering with the notch in said inwardly-extending flange, an obliquely-severed self-expansible locking ring provided with a groove in its outer face adapted to be sprung over the inner portions of the inwardly-extending flange of said rim and the inner portion of the second mentioned tire-retaining means for holding the latter in coöperating relation with said rim for sustaining a tire, said locking rim provided with a member positioned in the groove thereof and lapping the severed portions of the same arranged to be seated in said registering notches for holding the tire-retaining means against circumferential movement and means for holding the severed ends of said locking ring against unintentional displacement.

2. A locking ring for uniting a detachable tire-retaining member to a rim adapted to carry an elastic tire and embodying means for preventing movement of said tire-retaining means with respect to said rim comprising an obliquely-severed self-expansible resilient ring provided with a groove in its outer face, a locking member mounted in said groove adjacent to one end of said ring and adapted to overlap the severed ends thereof and provided with an inwardly-extending lug, the opposing end of said ring provided with a longitudinally-extending slot to receive said lug when said ring is in operative position and means carried by said lug for preventing said slotted end from being unintentionally displaced.

3. A locking ring for uniting an annular detachable tire-retaining member to a rim adapted to carry an elastic tire and provided with means for preventing movement of said tire-retaining means with respect to said rim, comprising an obliquely severed self-expansible resilient ring provided with a groove in its outer face, a locking member mounted in said groove adjacent to one end of said ring and overlapping the opposing ends of said ring and provided with a lug projecting inwardly from the inner face of said ring, the opposing ends of said ring adapted to coöperate with said locking member for preventing movement of said tire-retaining member with respect to said rim and means carried by said lug for preventing the free end of said ring from becoming unintentionally displaced.

In testimony whereof I have hereunto set my hand in presence of two subscribing witnesses.

JOHN M. ALDERFER.

Witnesses:
C. E. HUMPHREY.
GLENARA FOX.